US010902266B1

(12) United States Patent
Woolley

(10) Patent No.: US 10,902,266 B1
(45) Date of Patent: Jan. 26, 2021

(54) VARIABLE RATE TIME-LAPSE WITH SALIENCY

(71) Applicant: Vivint, Inc., Provo, UT (US)

(72) Inventor: Steven Woolley, Huntsville, UT (US)

(73) Assignee: Vivint, Inc., Provo, UT (US)

( * ) Notice: Subject to any disclaimer, the term of this patent is extended or adjusted under 35 U.S.C. 154(b) by 181 days.

(21) Appl. No.: 16/138,613

(22) Filed: Sep. 21, 2018

Related U.S. Application Data

(63) Continuation of application No. 15/591,953, filed on May 10, 2017, now Pat. No. 10,083,360.

(51) Int. Cl.
G06K 9/00 (2006.01)
H04N 7/18 (2006.01)
G06T 7/246 (2017.01)
G11B 27/031 (2006.01)
G11B 27/00 (2006.01)
G11B 27/10 (2006.01)
G08B 13/196 (2006.01)

(52) U.S. Cl.
CPC .......... *G06K 9/00751* (2013.01); *G06T 7/246* (2017.01); *G08B 13/19602* (2013.01); *G11B 27/005* (2013.01); *G11B 27/031* (2013.01); *G11B 27/10* (2013.01); *G06T 2207/10016* (2013.01); *G06T 2207/30232* (2013.01)

(58) Field of Classification Search
USPC ....... 382/100, 103, 107, 154, 162, 168, 173, 382/181, 190, 219, 232, 254, 276, 382/286–291, 305, 312; 348/143; 340/3.1
See application file for complete search history.

(56) References Cited

U.S. PATENT DOCUMENTS

| 6,107,918 A * | 8/2000 | Klein | G08B 25/14 340/3.1 |
| 9,170,707 B1 * | 10/2015 | Laska | H04L 9/0822 |
| 2013/0208112 A1 * | 8/2013 | Tanaka | H04N 5/2251 348/143 |
| 2014/0327768 A1 * | 11/2014 | Marshall | H04N 7/183 348/143 |
| 2016/0037126 A1 | 2/2016 | Polyakov et al. | |
| 2016/0094801 A1 | 3/2016 | Beysserie et al. | |
| 2016/0217348 A1 | 7/2016 | Cho et al. | |
| 2018/0113577 A1 * | 4/2018 | Burns | H04N 21/47217 |
| 2018/0115788 A1 * | 4/2018 | Burns | G06K 9/00771 |

* cited by examiner

Primary Examiner — Seyed H Azarian
(74) Attorney, Agent, or Firm — Holland & Hart, LLP

(57) ABSTRACT

A method for generating time-lapse representation of video footage in a security/automation system is described. In one embodiment, the method may include receiving video from a camera at a location associated with a home automation system, determining a first motion event in the video, identifying a level of priority associated with the first motion event, and generating a time-lapse representation of the video having a first frame rate for a first part of the time-lapse representation of the video and a second frame rate different from the first frame rate for a second part of the time-lapse representation of the video that includes the first motion event. In some cases, the time-lapse representation of the video may be generated based at least in part on the level of priority associated with the first motion event.

20 Claims, 10 Drawing Sheets

VARIABLE RATE TIME-LAPSE WITH SALIENCY

CROSS-REFERENCE TO RELATED APPLICATIONS

The present application is a continuation of U.S. patent application Ser. No. 15/591,953, filed May 10, 2017, titled "VARIABLE RATE TIME-LAPSE WITH SALIENCY," and assigned to the assignee hereof, the disclosure of which is expressly incorporated herein in its entirety by this reference.

BACKGROUND

The present disclosure relates to security and/or automation systems, and more particularly to systems and methods for providing a means by which home and security video footage may be automatically organized to generate a summary of the video footage with varying speed.

Security and automation systems are widely deployed to provide various types of communication and functional features such as monitoring, communication, notification, and/or others. These systems may be capable of supporting communication with a user through a communication connection or a system management action. Many homeowners are increasingly making use of video monitoring systems throughout their properties for both security and personal uses. Some cameras may be motion activated, while others may record on a continuous basis. Homeowners may only be interested in viewing clips containing motion (e.g., family members or pets in motion); however, homeowners may be required to look through voluminous quantities of footage to identify mere minutes or seconds of desired footage.

SUMMARY

In an effort to reduce instances of uninteresting or unnecessary video footage, existing home video monitors are configured to activate recording only based on detected motion. Recording only when motion is detected may prove largely unreliable when, for example, weather events trigger motion (e.g., branches moving, items blowing past a camera), or when outdoor lighting events (e.g., car headlights, lighting), activate outdoor light sensors. Similarly, indoor video monitors may detect motion when a person or a pet walks past a sensor associated with the camera; thus, much of the recorded footage may comprise unnecessary and uninteresting "passing by" footage.

It may be advantageous to provide a video analytics system to parse through the largely unnecessary and uninteresting footage to provide an easy-to-use "rapid summary" of a day. In some cases, the "rapid summary" may contain a time-lapse video footage with varying speeds. Accordingly, the systems and methods described herein provide a means for automatically generating a time-lapse representation of video footage, with variable speed, such that the speed at which the time-lapse representation relating to the highlights of the day is presented to a user is slower than the speed at which rest of the time-lapse representation is presented to the user.

Accordingly, in one embodiment, a method for security and/or automation systems is provided. In one embodiment, the method may comprise receiving video from a camera at a location associated with a home automation system. The method may further comprise determining a first motion event in the video, identifying a level of priority associated with the first motion event, and generating a time-lapse representation of the video having a first frame rate for a first part of the time-lapse representation of the video and a second frame rate different from the first frame rate for a second part of the time-lapse representation of the video that includes the first motion event based at least in part on the level of priority associated with the first motion event. The method may further comprise identifying the second frame rate relating to the first motion event, wherein the second frame rate is slower than the first frame rate.

In some embodiments, the method may include identifying the second frame rate for the first motion event based at least in part on the determined level of priority. In some embodiments, the method may include identifying a first level of priority associated with the first motion event and a second level of priority associated with a second motion event, and determining that the first motion event has a higher priority than the second motion event based at least in part on the first level of priority and the second level of priority. In some embodiments, the time-lapse representation of the video may be generated having the first frame rate for the first motion event and the second frame rate for the second motion event, the first frame rate being slower than the second frame rate.

In some embodiments, the level of priority associated with the first motion event is identified based at least in part on the received video, a user preference, or a combination thereof. In some embodiments, the user preference comprises an object identified in the video, an audio feature, a visual feature, a time, the location, a threshold occupancy, a detected motion, or a combination thereof.

In some embodiments, the method may include determining a pattern in a plurality of motion events at the location over a pre-determined period of time, and automatically identifying a characteristic of the first motion event based at least in part on the determined pattern. In some embodiments, the method may include identifying the second frame rate for the first motion event based at least in part on the identified characteristic.

In some embodiments, the method may include analyzing a plurality of motion events from the time-lapse representation of the video, identifying an emergency event in the time-lapse representation of the video, and communicating an emergency alert to a third party based at least in part on the emergency event.

In some embodiments, the method may include transmitting the time-lapse representation of the video to a device associated with a user of the security and/or automation system via an email, a text message, a notification to an application of the security and/or automation system, or a combination thereof, the transmitting being based at least in part on a user preference.

In some embodiments, the present disclosure may relate to an apparatus for security and/or automation systems, which may include a processor, a memory in electronic communication with the processor, and instructions stored in the memory. In any embodiment, the instructions stored in the memory may be executable by the processor to receive video from a camera at a location associated with a home automation system, determine a first motion event in the video, identify a level of priority associated with the first motion event, and generate a time-lapse representation of the video having a first frame rate for a first part of the time-lapse representation of the video and a second frame rate different from the first frame rate for a second part of the time-lapse representation of the video that includes the first motion event based at least in part on the level of priority associated with the first motion event.

In other embodiments, the present disclosure may relate to a non-transitory computer-readable medium storing computer-executable code, the code executable by a processor to receive video from a camera at a location associated with a home automation system, determine a first motion event in the video, identify a level of priority associated with the first motion event, and generate a time-lapse representation of the video having a first frame rate for a first part of the time-lapse representation of the video and a second frame rate different from the first frame rate for a second part of the time-lapse representation of the video that includes the first motion event based at least in part on the level of priority associated with the first motion event.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
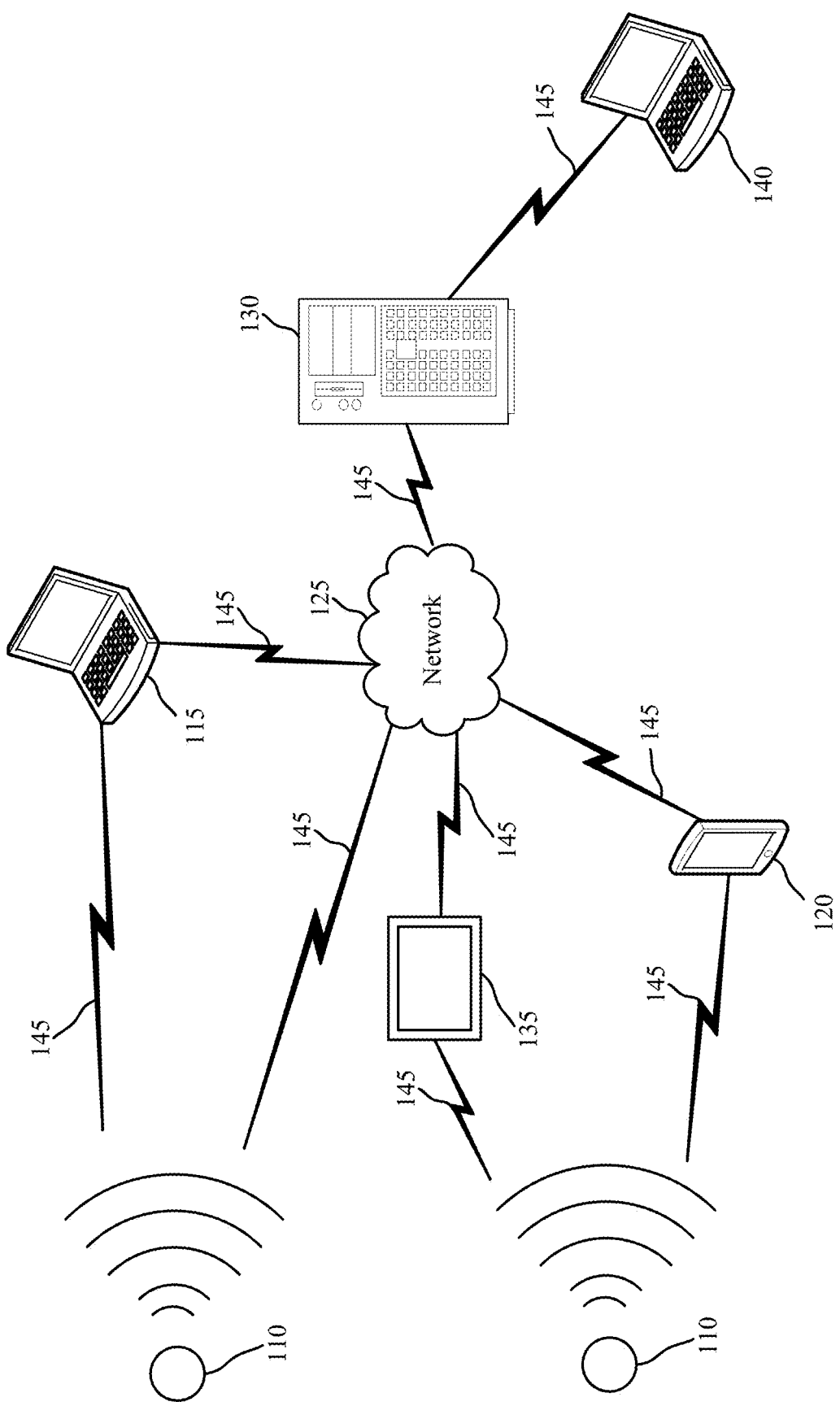
FIG. 1 is a block diagram of an example of a security and/or automation system in accordance with various embodiments.

Time-lapse photography is a technique where a frequency at which film frames are captured (e.g., the frame rate) is much lower than the frequency used to view the sequence of frames; for example, a time-lapse video may be generated by dropping all but 1 in every N "frames" of a video. One aspect of the present invention relates to providing systems and methods by which a video camera may identify one or more frames containing motion and may generate a time-lapse summary video of a day. In some examples, the system may generate a time-lapse summary of the day including multiple still images describing highlights of the day. In some examples, the systems and methods may generate a time-lapse video summarizing a day by keeping more "frames" in the video during times when motion events were detected by sensors.

In one example, a home automation system may continuously record video footage within a home. The home automation system may generate a time-lapse summary of the video footage. This time-lapse summary of the video footage may be any of a slideshow, continuous videos, a combination of images and video clips, thumbnails, single-cut videos, still photographs, or a combination thereof. In some examples, among a plurality of recorded video footage, the home automation system may identify one or more video frames containing motion. While generating the time-lapse summary, the home automation system may determine a speed of the time-lapse video when there is no motion detected, and a speed of the time-lapse video when there is motion detected by the sensors. For example, the home automation system may generate a video for rapid summary of the day (at the rate of 4 seconds of rapid summary being generated per hour of video) when there is no motion detected by the sensors, and during motion events the home automation system may slow down the speed of the video from the faster speed to a slower speed (e.g., 1 second per hour). In such cases, the home automation system may determine a speed for motion events such that the summary video is still fast but allows a user to identify the motion.

In some examples, the home automation system may identify a speed of the time-lapse summary based on a priority level associated with the detected motion; for example, the home automation system may identify that there is a child with his babysitter in the living room. The home automation system may use one or more additional sensors in other parts of the house to determine that the parents (or any other adult) are not present in the house. The parent may want to receive detailed video footage of the child and the babysitter. The home automation system may use biometric methods, such as facial recognition technology, to identify video footage including the child and his babysitter. While generating the time-lapse summary of the day, the home automation system may slow down frames/ second rate of video clips identified as including the babysitter. In some embodiments, the home automation system may send the summary (e.g., the time-lapse video) to the user; for example, the home automation system may send the video to the user via an email, a text message, a notification to the smart home system application, or a combination thereof.

Although the systems and methods described herein may identify motion-related events, not all motion recorded by the cameras may be important to or of interest to the homeowner; therefore, one aspect of the present invention relates to providing systems and methods by which a homeowner may "teach" a home automation system to identify "interesting" footage recorded by at least one home video monitor. The homeowner may input, at the home automation system, preferences related to recorded footage containing all, or particular, members of his family. In response to receiving specific preferences from the homeowner, the home automation system may identify all footage featuring human occupants of the home or, may identify footage comprising only particular individuals identified using, for example, biometric identification technologies, such as facial recognition, sound recognition, gait recognition, etc. Similarly, the homeowner may input preferences at the home automation system to view recorded footage containing household pets, where the system may identify only those scenes in which the pets are active, as opposed to sleeping, within a field of view of at least one home video monitor. In some examples, a homeowner who has selected preferences to prioritize video footage containing "fun" scenes of his dog throughout the day, may receive a five minute video compiling all video clips recorded throughout the day, but the clips in which the dog was featured may be presented at a slower speed than the rest of the video clip.

In some examples, the home automation system may determine different playback speeds for different activities; for example, the home automation system may have the capability to identify "normal" motions within a home. "Normal" motions may be identified by the home automation system as a pattern of one or more recognized motions within a location, such as the home as a whole, a specific room, a doorway, a window, the garage, the front porch, etc. In some examples, the home automation system may identify that a motion does not fit the identified pattern. In some embodiments, the home automation system may adjust the speed of the time-lapse summary based on the recognized pattern.

In one example embodiment, the home automation system may determine that a user's child is supposed to return home from school at 3:00 p.m. on weekdays. Upon identifying the child in the video footage at 3:00 p.m., the home automation system may determine that the motion of the child corresponds to the identified pattern. Based on the determination, the home automation system may adjust the speed of the video footage of the child returning from school. In other embodiments, the home automation system may automatically prioritize video footage by comparing footage recorded over a specified time period (e.g., the past month), and identifying any scenes containing elements not commonly contained in the footage. For example, the footage recorded over the span of a month may largely contain "passing by" footage of home occupants and pets and may therefore be discarded as "regular" footage, while footage containing other activities may be less common. By default, these less common scenes may be identified as "interesting."

In some examples, the homeowner may wish to prioritize recorded video footage based on identified activities; for example, a parent may wish to view all of the footage showing his daughter practicing piano. The home automation system may use facial recognition technology to identify frames containing the daughter practicing the piano. The home automation system may then create the time-lapse summary, such that the video footage of the daughter practicing piano is presented to the homeowner at a regular speed, and the rest of the time-lapse summary may be presented as still images or at a faster speed. In some examples, the parent may "teach" the home automation system to identify future piano practice sessions by labeling pre-recorded or currently-recording piano practice sessions, such that the system may identify future piano practice sessions based on similarly identified features.

In some examples, the system may identify a time associated with a specific activity; for example, the home automation system may identify that a piano practice session starts at 4:00 p.m. The home automation system may use facial recognition technology to determine an identity of the person participating in the piano practice session. Based on the identity of the person, the home automation system may prioritize the video footage of the piano practice session.

In some embodiments, the homeowner may wish to prioritize recorded video footage based on identified activities without limiting the prioritization to any particular individual. Thus, the home automation system may identify any home occupants playing the piano, and the system may create the time-lapse summary such that the video footage of any home occupants playing the piano is presented to the homeowner at a speed slower than the speed of the rest of time-lapse video.

In some embodiments, the time-lapse summary may be used to detect emergency events; for example, the home automation system may monitor currently-recording footage containing an elderly family member, and the system may issue an alert when, using a combination of biometric technology (e.g., facial recognition) and motion, vibration, or vital sign sensors, the system detects that the elderly family member has fallen or has experienced a medical emergency. The alert may be communicated to the homeowner or an emergency dispatcher so that assistance may be provided.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a home automation system 100 in accordance with various aspects of the disclosure. In some embodiments, the home automation system 100 may include one or more sensor units 110, a local computing device 115, 120, a network 125, a server 130, a control panel 135, and a remote computing device 140. The network 125 may provide user authentication, encryption, access authorization, tracking, Internet Protocol (IP) connectivity, and other access, calculation, modification, and/or functions. The control panel 135 may interface with the network 125 through wired and/or wireless communication links 145 and may perform communication configuration, adjustment, and/or scheduling for communication with local computing device 115, 120 or remote computing device 140, or may operate under the control of a controller. Control panel 135 may communicate with a backend server 130-directly and/or indirectly-using one or more communication links 145.

The control panel 135 may wirelessly communicate via communication links 145 with the local computing device 115, 120 via one or more antennas. The control panel 135 may provide communication coverage for a geographic coverage area. In some examples, control panel 135 may be referred to as a control device, a base transceiver station, a radio base station, an access point, a radio transceiver, a home automation control panel, a smart home panel, or some other suitable terminology. The geographic coverage area for control panel 135 may be divided into sectors making up only a portion of the coverage area. The home automation system 100 may include one or more control panels 135 of different types.

The control panel 135 may be related to one or more discrete structures (e.g., a home, a business) and each of the one more discrete structures may be related to one or more discrete areas. In some embodiments, control panel 135 may be a home automation system control panel, for example an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

As described in more detail below with respect to FIGS. 2-3, the control panel 135 may be operable to receive a plurality of video footage from one or more sensor units 110, to detect motion events in the video footage, to review the video footage recorded over a pre-determined period of time to determine a priority associated with the motion event, and to generate a time-lapse summary of the video footage. The control panel 135 may further be operable to generate the time-lapse summary having a first frame rate for a first part of the time-lapse summary and a second frame rate different from the first frame rate for a second part of the time-lapse summary. The time-lapse summary (e.g., time-lapse representation of the video footage) may be any representation of the recorded video footage. The time-lapse summary may then be viewable by a user at the control panel 135, or alternatively at a local computing device 115, 120 or remote computing device 140.

The local computing devices 115, 120 may be dispersed throughout the home automation system 100 and each device 115, 120 may be stationary and/or mobile. Local computing devices 115, 120 and remote computing device 140 may be custom computing entities configured to interact with one or more sensor units 110 via network 125, and in some embodiments, via server 130. In other embodiments, local computing devices 115, 120 and remote computing device 140 may be general purpose computing entities. A computing device 115, 120 or 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A computing device 115, 120 or 140 may also include or be referred to by those skilled in the art as a user device, a sensor, a smartphone, an iPod®, an iPad®, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

A local computing device 115, 120 and/or control panel 135 may include and/or be one or more sensors that sense: proximity, motion, temperatures, vibration, humidity, sound level or auditory input, smoke, structural features (e.g., glass breaking, window position, door position), time, geo-location data of a user and/or a device, distance, biometrics, weight, speed, height, size, preferences, light, darkness, weather, time, system performance, facial features, and/or other inputs that relate to a home automation system. A local computing device 115, 120 may be able to communicate through one or more wired and/or wireless communication links 145 with various components such as control panels, base stations, and/or network equipment (e.g., servers, wireless communication points, etc.) and/or the like.

The communication links 145 shown in home automation system 100 may include uplink (UL) transmissions from a local computing device 115, 120 to a control panel 135, and/or downlink (DL) transmissions from a control panel 135 to a local computing device 115, 120. The downlink transmissions may also be called forward link transmissions while the uplink transmissions may also be called reverse link transmissions. Each communication link 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 145 may transmit bidirectional communications and/or unidirectional communications. Communication links 145 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to home automation systems.

In some embodiments of home automation system 100, control panel 135 and/or local computing devices 115, 120 may include one or more antennas for employing antenna diversity schemes to improve communication quality and reliability between control panel 135 and local computing devices 115, 120. Additionally or alternatively, control panel 135 and/or local computing devices 115, 120 may employ multiple-input, multiple-output (MIMO) techniques that may take advantage of multi-path, mesh-type environments to transmit multiple spatial layers carrying the same or different coded data.

While the local computing devices 115, 120 may communicate with each other through the control panel 135 using communication links 145, each local computing device 115, 120 may also communicate directly with one or more other devices via one or more direct communication links 145. Two or more local computing devices 115, 120 may communicate via a direct communication link 145 when both devices 115, 120 are in the geographic coverage area or when one or neither devices 115, 120 is within the geographic coverage area. Examples of direct communication links 145 may include Wi-Fi Direct, Bluetooth, wired, and/or, and other P2P group connections. The devices 115, 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within home automation system 100.

In some embodiments, one or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required. Additionally, in alternate embodiments, one or more sensor units 110 may be integrated with control panel 135, and/or control panel 135 may be integrated with local computing device 115, 120, such that separate components are not required.

The local computing devices 115, 120 and/or control panel 135 may include memory, a processor, an output, a data input and a communication component. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 and/or control panel 135 may include one or more hardware-based components (e.g., DSP, FPGA, ASIC) and/or software-based components (e.g., a component of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 and/or control panel 135 may be operable to control operation of the output of the local computing devices 115, 120 and/or control panel 135. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output component may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 and/or control panel 135 to the output.

The remote computing device 140 may be a computing entity operable to enable a remote user to monitor the output of the one or more sensor units 110, or to retrieve the time-lapse representation of the video footage. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to recording users and activities in and around the home. In particular, the one or more sensor units 110 may be operable to collect video footage and/or audio footage, and may additionally be operable to detect user data and activity data accompanying the collected video footage and/or audio footage, such as user identity, motion data, location data, and the like. Each sensor unit 110 may be capable of sensing multiple parameters, or alternatively, separate sensor units 110 may monitor separate parameters. For example, one sensor unit 110 may be a video recording device, while another sensor unit 110 (or, in some embodiments, the same sensor unit 110) may be an audio recording device. In some embodiments, one or more sensor units 110 may additionally monitor alternate user and activity parameters, for example using location sensors, vibration sensors, occupancy sensors, motion sensors, facial recognition sensors, bio-signature sensors, or the like.

In some embodiments, the one or more sensor units 110 may be separate from the control panel 135, and may be positioned at various locations throughout the home or property. In other embodiments, the one or more sensor units 110 may be integrated or collocated with home automation system components or home appliances or fixtures. For example, a sensor unit 110 may be integrated with a wall outlet or switch. In still other embodiments, the one or more sensor units 110 may be integrated or collocated with the control panel 135 itself.

Data and video footage gathered by the one or more sensor units 110 may be communicated to local computing device 115, 120, which may be, in some embodiments, a control panel or other wall-mounted input/output home automation system display. In other embodiments, local computing device 115, 120 may be a personal computer or smartphone. Where local computing device 115, 120 is a smartphone, the smartphone may have a dedicated application directed to collecting, analyzing, and/or displaying video footage. The local computing device 115, 120 may process the video footage received from the one or more sensor units 110 by automatically identifying at least one distinguishing feature for the motion event in the footage and generating a priority for the motion event, accordingly. A time-lapse representation of the video footage may then be generated based on the priority. The time-lapse representation of the video footage may be stored and presented for viewing by the user at the control panel 135, local computing device 115, 120, and/or remote computing device 140, or may be stored at server 130.

In alternate embodiments, remote computing device 140 may process the data and video footage received from the one or more sensor units 110, via network 125 and server 130, to provide time-lapse representation of the video footage for user viewing. Data transmission may occur via, for example, frequencies appropriate for a personal area network (such as Bluetooth or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the one or more sensor units 110 or local computing devices 115, 120, or may simply forward the received information to the remote computing device 140 and control panel 135.

Server 130 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 130 may receive a stream of user activity data based on motion detection from a sensor unit 110, a stream of video footage from the same or a different sensor unit 110, and a stream of audio data from the same or yet another sensor unit 110. In some embodiments, server 130 may "pull" the data streams, e.g., by querying the sensor units 110, the local computing devices 115, 120, and/or the control panel 135.

In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing video footage and user or activity data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with the time-lapse representation of the video footage.

Figure 2A:
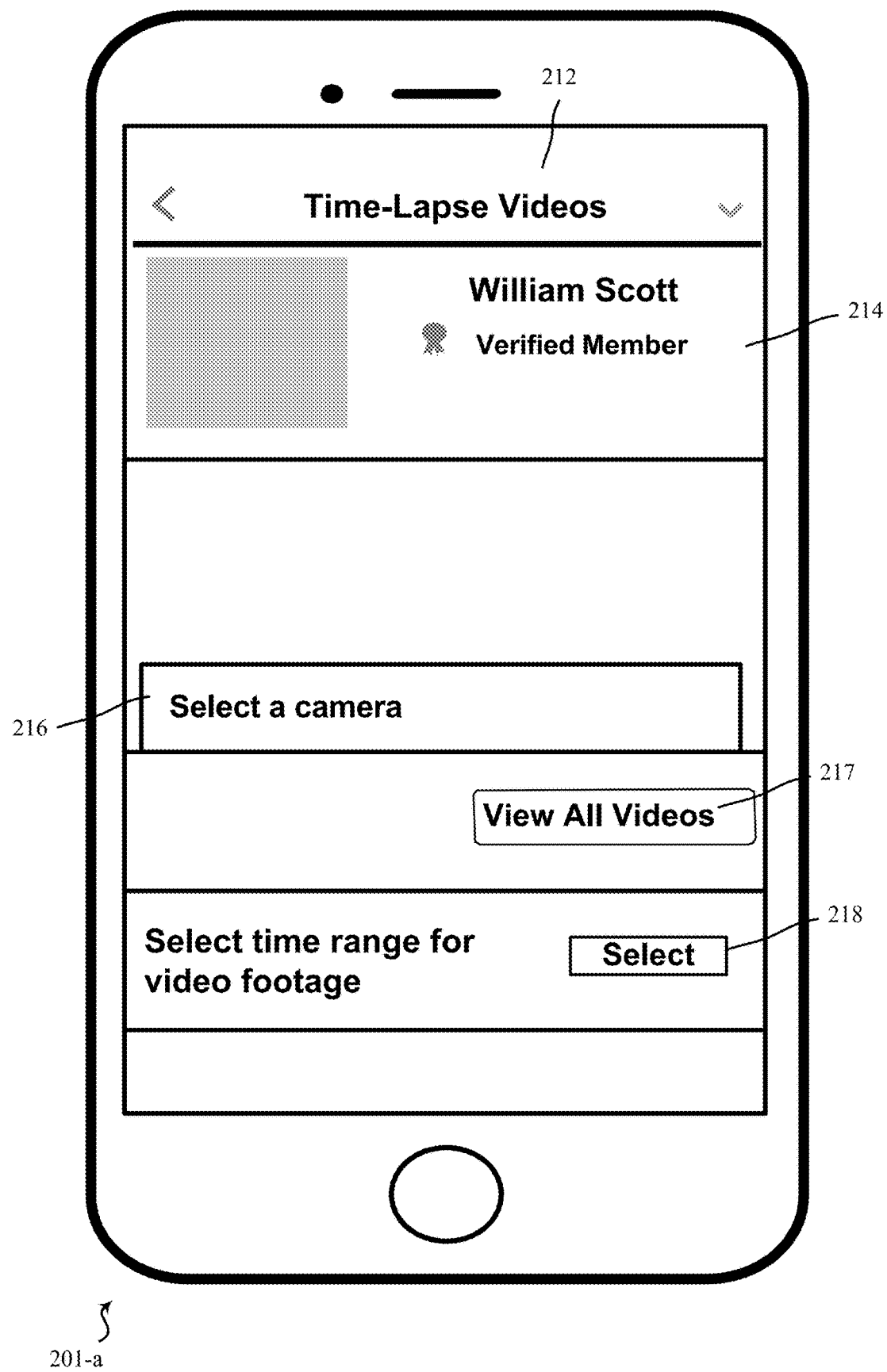
FIG. 2A shows an exemplary user interface relating to a security and/or an automation system, in accordance with various aspects of this disclosure.
Figure 2B:
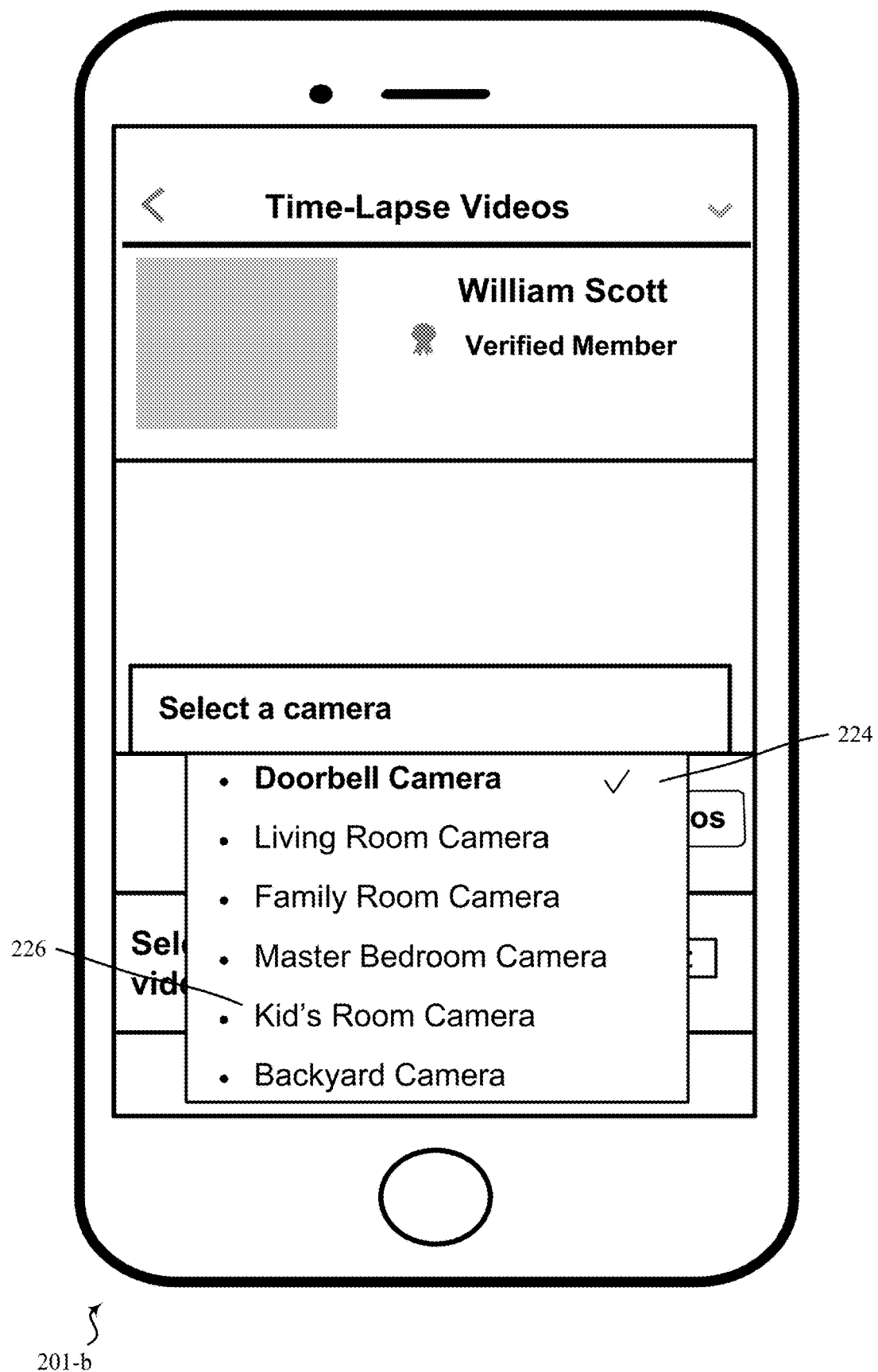
FIG. 2B shows an exemplary user interface relating to a security and/or an automation system, in accordance with various aspects of this disclosure.
Figure 2C:
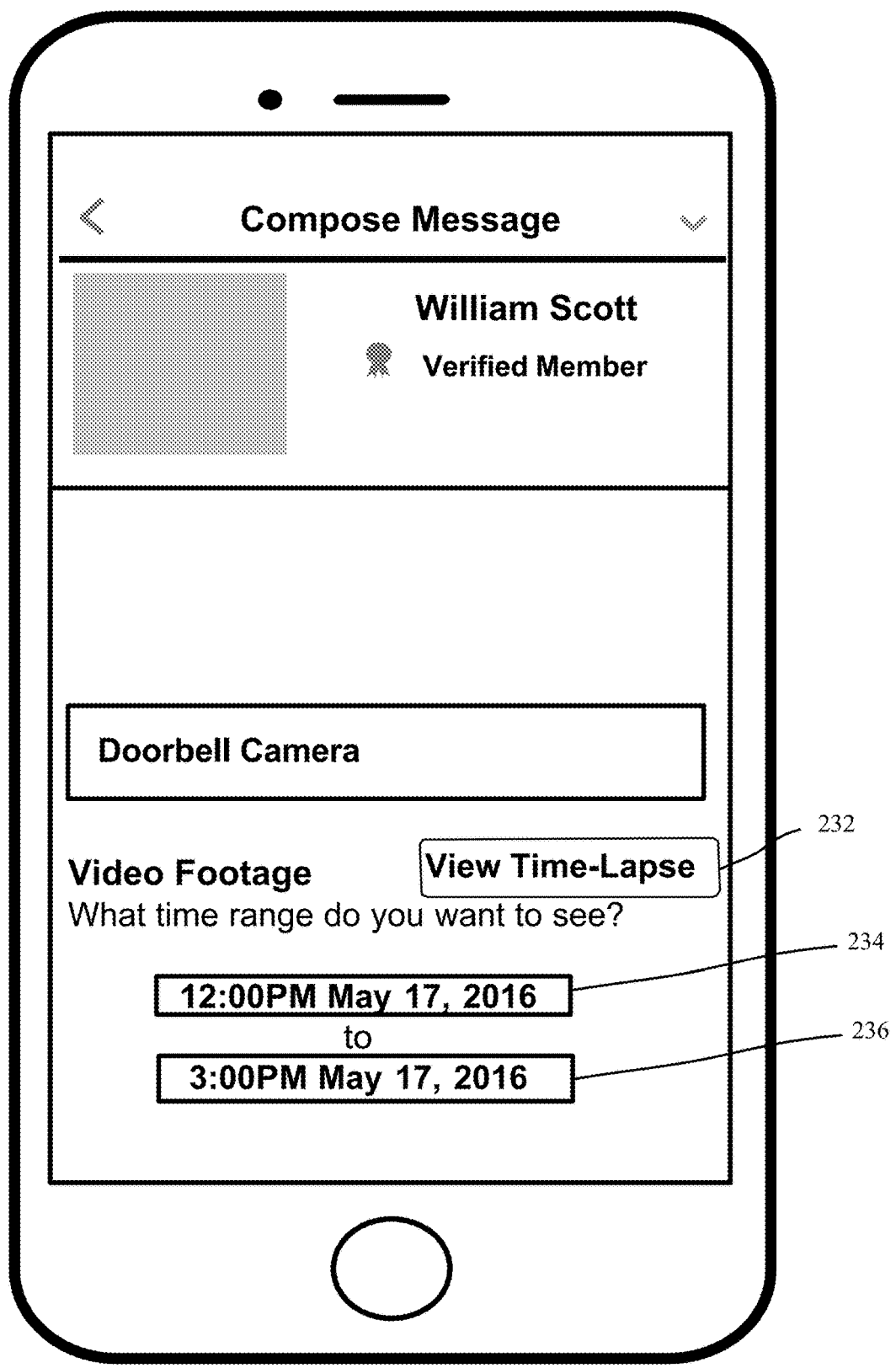
FIG. 2C shows an exemplary user interface relating to a security and/or an automation system, in accordance with various aspects of this disclosure.

FIGS. 2A-2C show block diagrams relating to a security and/or an automation system, in accordance with various aspects of this disclosure. Particularly, FIG. 2A describes an exemplary user interface 201-*a* for generating and reviewing time-lapse videos. In some examples, the user interface 201-*a* may be generated by the time-lapse component 415, along with other components or elements. The user interface 201-*a* may be generated in response to user input (e.g., a user's request to view a time-lapse video). In some cases, the user interface 201-*a* may be automatically generated by the security and/automation system. The window 212 for selecting a camera for viewing a time-lapse video may include the details 214 of the user (e.g., name, status, verification), where there user may be, for example, an occupant of the house associated with the home automation system. The user interface 201-*a* may also indicate if the user making the request for time-lapse videos is a verified member associated with the home automation system. The window 212 may also enable the user to select a camera 216 from which the time-lapse video footage is generated, or the user may select an option to view all video footage 217 recorded by multiple cameras at multiple locations of the home. The user may also select a time range 218 for generating a time-lapse video; for example, the user may request to view a summary of video footage captured between 9:00 a.m. and 5:00 p.m.

Referring now to FIG. 2B, an exemplary user interface 201-*b* for generating and reviewing time-lapse videos is described. In some examples, the user interface 201-*b* may be generated by the time-lapse component 415, along with other components or elements. The user interface 201-*b* may be generated in response to the user's request to view a time-lapse video. The window for requesting a time-lapse video (or summary-of-the-day video) may include the name and details of the requesting user and an option for the user to select the camera from which the video recorded by the selected camera is used to generate the time-lapse video. Upon receiving a user request to select a camera, a list of cameras 224 may be presented to the user. The list of cameras 224 may include one or more camera names 226 describing a general location of the cameras, for example, the camera names can be doorbell camera, living room camera, family room camera, master bedroom camera, child's bedroom camera, and backyard camera. In some cases, the camera names may be inputted by the user. In other embodiments, the list of cameras 224 may be identifiable by other means such as a type of camera, serial numbers, wireless network connectivity, or other identifiers.

Referring now to FIG. 2C, an exemplary user interface 201-*c* for generating and reviewing time-lapse videos is described. In some examples, the user interface 201-*c* may be generated by the time-lapse component 415, along with other components or elements. The user interface 201-*c* may be generated in response to the user's request to view a time-lapse video. The window for requesting a time-lapse video (or summary-of-the-day video) may include the name and details of the requesting user and an option for the user to select the camera from which the video recorded by the selected camera is used to generate the time-lapse video. After the user selects a camera, the user may be prompted to select a requested time range. The requesting user may select a start time 234 and an end time 236 for the requested summary video (time-lapse of video footage from doorbell camera); for example, the user may request summary video footage recorded between 12:00 p.m. (start time) and 3:00 p.m. (end time) on May 17, 2016. After the time range selection, the user may request to view the summary video for the selected time range via element 232.

Figure 3:
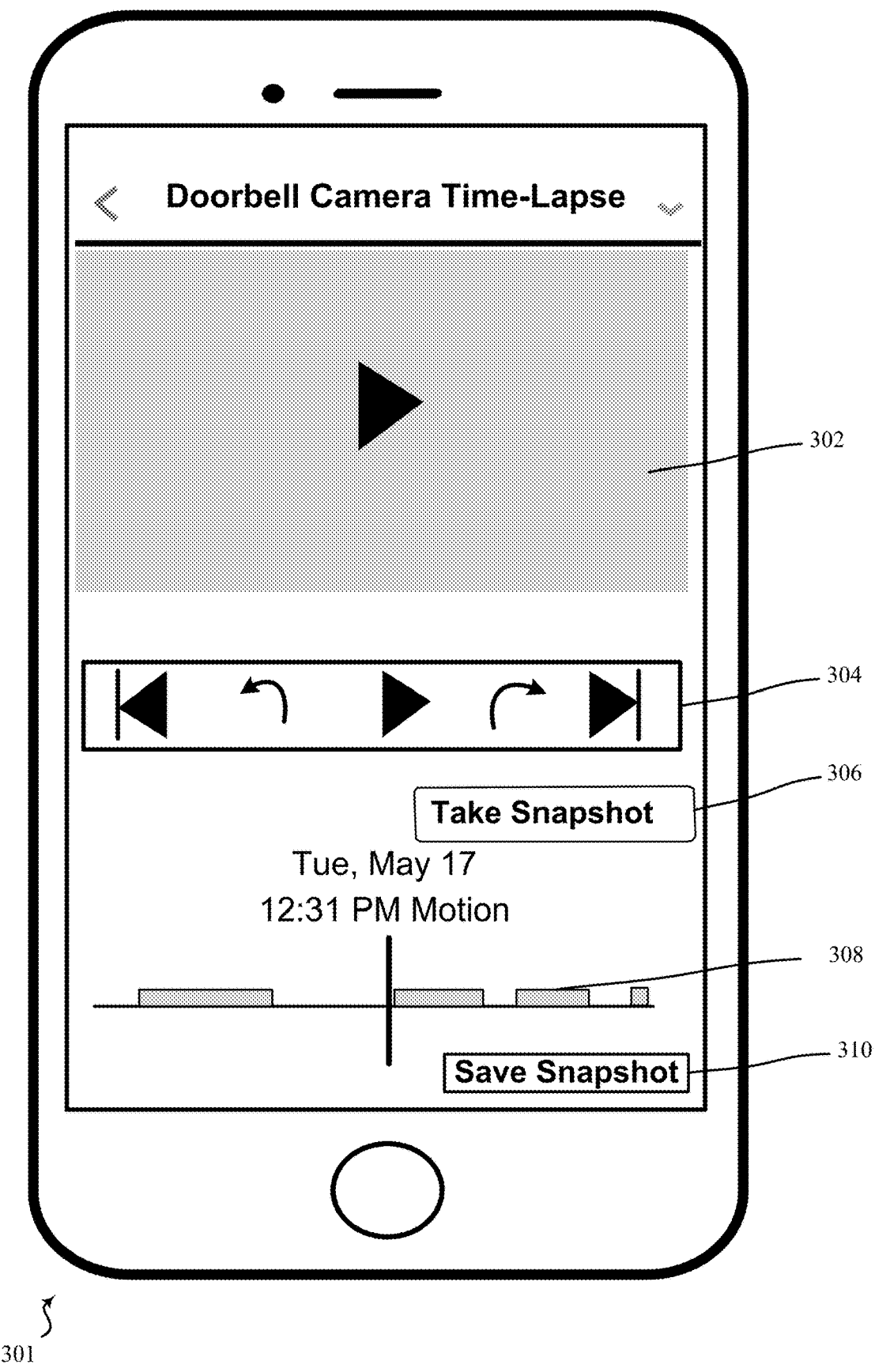
FIG. 3 shows an exemplary user interface relating to a security and/or an automation system, in accordance with various aspects of this disclosure.

FIG. 3 shows block diagram relating to a security and/or an automation system, in accordance with various aspects of this disclosure. In particular, FIG. 3 relates to an exemplary user interface 301 for reviewing time-lapse videos. In some examples, the user interface 301 may be generated by the time-lapse component 415, along other components or elements. The user interface 301 may be generated in response to the user's request to view a time-lapse video. The time-lapse video may be associated with or based on the time range requested by the user. For example, a user may request to view a time-lapse video of camera footage captured at the doorbell camera. The user may then view the time-lapse video (e.g., camera footage at a higher frames/second) using one or more displays 302. The user interface 301 for viewing the time-lapse video may also include one or more elements 304 to enable the user to pause, play, rewind and/or replay the same video, and/or also enable the user to skip the current time-lapse video and view a time-lapse summary video.

The user interface 301 for viewing the summary of doorbell camera footage (e.g., the time-lapse video) may also enable the user to save a subset of the summary video via one or more elements 306 while viewing the time-lapse video. For example, the viewer may take a snapshot from the time-lapse video 302 (e.g., a summary video with motion events having a slower speed than the rest of the video, a time-lapse representation of doorbell camera footage with still images, etc.) and may decide to save the subset using one or more elements 310. In some examples, the user interface 301 for viewing the time-lapse video may provide an indication that there may be related and/or relevant footage (e.g., footage with more motion events) outside the requested time period (e.g., before/after the requested time period). The user interface 301 for viewing the time-lapse video may also enable the user to view a summary or a high-level representation of the time-lapse video. The summary or high-level representation may indicate footage portions 308 that include important information (e.g., when the camera detects human motion).

Figure 4:
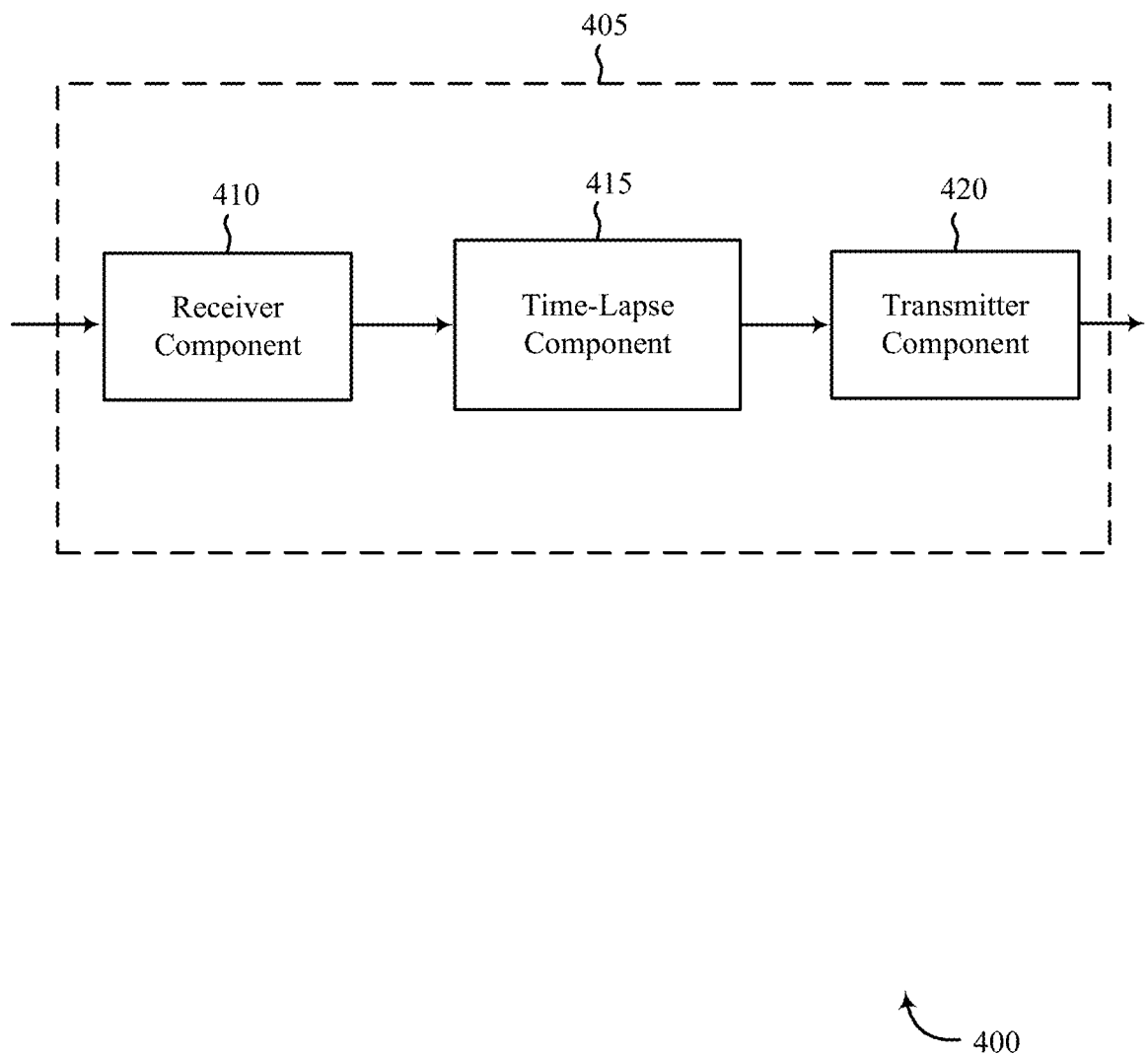
FIG. 4 shows a block diagram of a device relating to a security and/or an automation system, in accordance with various aspects of this disclosure.

FIG. 4 shows a block diagram 400 of an apparatus 405 for use in a security and/or automation system, in accordance with various aspects of this disclosure. The apparatus 405 may be an example of one or more aspects of a control panel 135, or in other embodiments may be an example of one or more aspects of the one or more sensor units 110, or in still other embodiments may be an example of one or more aspects of the local computing device 115, 120 or remote computing device 140, each of which are described with reference to FIG. 1. The apparatus 405 may include any of a receiver component 410, a time-lapse component 415, and/or a transmitter component 420. The apparatus 405 may also be or include a processor. Each of these components may be in communication with each other-directly and/or indirectly.

The components of the apparatus 405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented—in whole or in part—with instructions embodied in memory formatted to be executed by one or more general and/or application-specific processors.

The receiver component 410 may receive information such as packets, user data, and/or control information associated with various information channels (e.g., control channels, data channels, etc.). The receiver component 410 may be configured to receive a plurality of data (e.g., audio/video footage) from the one or more sensor units, which may be any of a video recorder, audio recorder, or a combination thereof. The receiver component 410 may be further configured to receive additional user and/or activity data from the one or more sensor units, such as the identity of the recorded user, the location of the recorded user, motion data for the user, or the like.

In some embodiments, the receiver component 410 may be additionally configured to receive inputted user preferences regarding one or more distinguishing features relating to motion events to be identified in the recorded video footage. For example, a parent may input, at a control panel or in a dedicated application on a smartphone, preferences relating to motion events in the video footage containing recordings of their children. The system may thus identify clips containing the identified children and may assign a higher priority to the video footage containing those recordings. In another example, a user may input, at the control panel or on a smartphone, preferences relating to audio recordings that detect music (e.g., home occupants practicing piano or singing). The system may accordingly identify clips containing the specified audio recordings (e.g., piano played by a certain individual), and may accordingly assign a priority to the audio recordings in the video footage. In some embodiments, the inputted user preferences may be utilized to review previously recorded video footage and identify a level of priority associated with the previously recorded video footage. Additionally or alternatively, the inputted user preferences may be utilized to identify distinguishing features in future video and/or audio footage. In one embodiment, the inputted user preferences may be used to identify a first level of priority for a first distinguishing feature and a second level of priority for a second distinguishing feature. For example, the distinguishing features may be a motion event such as dancing, an audio recording such as the piano being played, video clips of an individual such as a specific child, or a combination thereof.

In some examples, apparatus 405 is one or more sensor units. The monitored video and/or audio footage, the activity data, and/or the user data may be collected locally at the apparatus 405 and received by the receiver component 410. In embodiments where a user inputs preferences regarding one or more distinguishing features in the recorded video footage, the preferences may be inputted at any of a control panel, local computing device, or remote computing device, and may be subsequently communicated via wired or wireless communication links to apparatus 405 at receiver component 410. In other embodiments, where apparatus 405 is any of a control panel, local computing device, or remote computing device, the video footage, activity data, and/or user data may be monitored at the one or more sensor units and may be communicated to the apparatus 405 at receiver component 410.

Any of the received plurality of video footage audio footage, activity data, user data, and/or inputted user preferences may be communicated from the receiver component 410 to the time-lapse component 415. Time-lapse component 415 may be operable to receive video footage from one or more camera, review the plurality of received video footage, along with any accompanying activity data, user data, and/or inputted user preferences, determine motion events from the received video footage, determine a level of priority associated with the motion event, and generate a time-lapse representation of the video footage based at least in part on the level of priority. For example, time-lapse component 415 may review video footage recorded over one day, one week, one month, or the like.

Using data (e.g., motion detection data) received via one or more sensor units at receiver component 410, time-lapse component 415 may sort "higher priority" clips from "lower priority" clips among the video footage, the latter including, for example, video recordings of empty rooms, or of occupants sitting still or sleeping. Time-lapse component 415 may be configured to generate the time-lapse representation at a faster frame rate for the lower priority clips and a slower frame rate for the higher priority clips. For example, time-lapse component 415 may generate a stream of image frames summarizing the events recorded over one day, where the high priority" clips are displayed at a slower rate than the "lower priority" clips. The stream of image frames may be displayed as a time-lapse video, a continuous slideshow of multiple images, a combination of video and still images, etc.

Time-lapse component 415 may further review the video footage containing motion events and identify at least one distinguishing feature. Time-lapse component 415 may determine a priority level for the distinguishing feature; for example, time-lapse component 415 may detect, using user data collected by one or more sensor units over a predetermined period of time, that the majority of video footage collected in a particular location contains four or fewer occupants. Time-lapse component 415 may further determine that in a few select scenes, the video footage contains 10 occupants. Time-lapse component 415 may automatically infer, based on the video footage collected over that period of time, that the footage containing 10 people was recorded during a special event or party, and should have a higher priority. In another example, time-lapse component 415 may detect, using activity data collected by one or more sensor units, that the majority of video footage contains very little movement, but that in a few select scenes, the video footage contains a marked increase in detected motion.

Time-lapse component 415 may automatically infer, based on the collected video footage, that the footage containing the marked increase in user movement was recorded during a period of interest, for example, when the home occupants were playing, and therefore marks the detected motion in the video footage as a "high priority" motion event. Other embodiments may include any other noticeable distinguishing feature identified over the predetermined period, including, but not limited to, increased or unusual audio, vibration, temperature, lighting, facial expressions, temporal data, and the like. As discussed in more detail below, time-lapse component 415 may accordingly index the identified motion events from one or more video clips "of interest" for generating a time-lapse summary, for example by generating a "summary video of the day," that summarizes motion events recorded over a day.

The identified and indexed motion events from the recorded video footage may be used to generate a time-lapse representation of the video footage. The time-lapse representation of the video footage may then be communicated from time-lapse component 415 to transmitter component 420, where transmitter component 420 may communicate the time-lapse representation of the video footage to the user or to storage. For example, time-lapse component 415 may identify a video containing unusual audio, such as users singing, and may generate a time-lapse representation of the video including the video clip of users singing, along with still images from the rest of the video footage. Time-lapse component 415 may communicate the time-lapse representation of the video footage including the clip of the users singing, via transmitter component 420, to the user at his smartphone. In some embodiments, the clip of the users singing may be sent individually. In some other embodiments, time-lapse component 415 may combine video footage from multiple cameras to generate a common time-lapse representation of the video footage. For example, multiple video footage may be combined to determine video clips containing common distinguishing features (e.g., clips containing a particular identified user, clips recorded in a particular room or on a particular day, clips containing a particular identified activity, and the like.) In some embodiments, the time-lapse representation of the combined video footage may be communicated with accompanying pertinent information collected at receiver component 410 from one or more sensor units, such as the identity of the users in the clip, the time and location of the recording of the users, and the like.

In other embodiments, instead of or in addition to communicating the time-lapse representation of video footage to the user, transmitter component 420 may communicate the time-lapse representation to the server 130 for storage and/or processing; for example, a time-lapse representation of a plurality of video clips may be communicated to server 130. In some examples, server 130 may be configured to compile one or more time-lapse videos according to a commonly identified distinguishing feature, and may store for later viewing by the user.

In still other embodiments, where apparatus 405 is a control panel, transmitter component 420 may communicate the time-lapse representation of the video clips locally to be displayed at or projected by the control panel. The time-lapse representations may be accessible by the user at the control panel by inputting a request to view, or in some embodiments may be displayed or projected automatically, for example, upon detecting approach of an identified user to the control panel via one or more sensor units.

Figure 5:
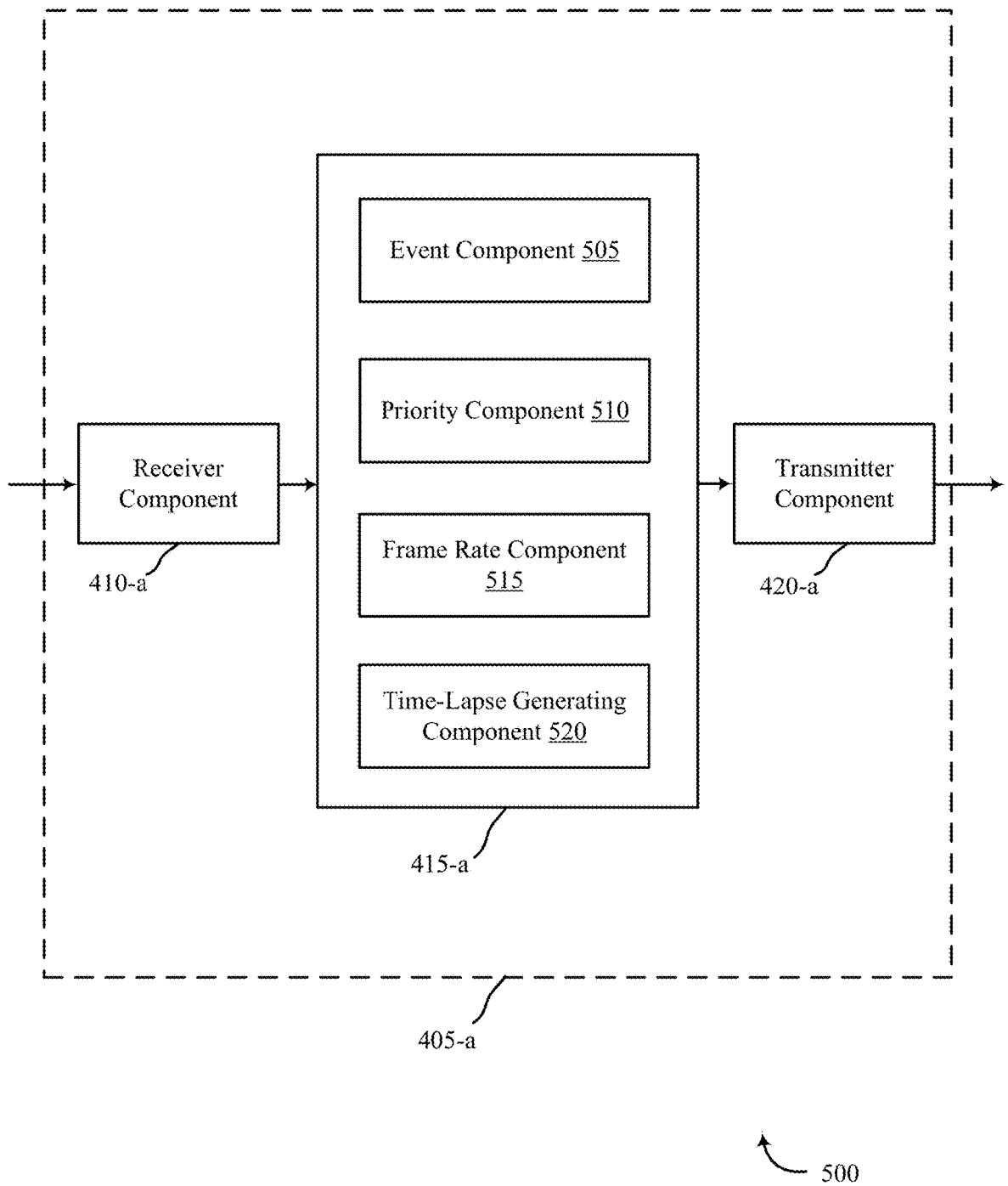
FIG. 5 shows a block diagram relating to a security and/or an automation system, in accordance with various aspects of this disclosure.

In FIG. 5, apparatus 405-*a* may be an example of apparatus 405 illustrated in FIG. 4. Apparatus 405-*a* may comprise any of a receiver component 410-*a*, a time-lapse component 415-*a*, and/or a transmitter component 420-*a*, each of which may be examples of the receiver component 410, the time-lapse component 415, and the transmitter component 420 as illustrated in FIG. 4. Apparatus 405-*a* may further comprise, as a component of the time-lapse component 415-*a*, any of an event component 505, a priority component 510, a frame rate component 515, or a time-lapse generating component 520, or a combination thereof.

The components of apparatus 405-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented—in whole or in part—with instructions embodied in memory formatted to be executed by one or more general and/or application-specific processors.

As previously discussed, apparatus 405-*a* may be any of a control panel, a local computing device, a remote computing device, or one or more sensor unit. Receiver component 410-*a* may operate as described with respect to FIG. 4. For example, where apparatus 405-*a* is a control panel, receiver component 410-*a* may receive monitored video footage, audio footage, image data, activity data, and/or user data via one or more sensor units, and in some embodiments may receive user inputted preferences directly at apparatus 405-*a* or via a local or remote computing device. In other examples, where apparatus 405-*a* is one or more sensor units, receiver component 410-*a* may receive monitored video footage, audio footage, image data, activity data, user preferences, and/or user data directly.

Time-lapse component 415-*a* may similarly operate as described with respect to FIG. 4. In particular, time-lapse component 415-*a* may comprise an event component 505, a priority component 510, a frame rate component 515, or a time-lapse generating component 520. The event component 505 may be operable to receive video footage, audio footage and/or image data from one or more sensors at a location associated with a home automation system, review the received footage and image data, and determine a motion event from the received footage.

For example, receiver component 410-a may communicate to event component 505 a plurality of video footage recorded over the course of a pre-determined period of time. In some cases, the period of time may be a day, a week, a month, etc. In some examples, the user may input a custom range of time via the control panel. Event component 505 may review the recorded footage to identify at least one motion event. In some embodiments, event component 505 may automatically review the motion events to identify one or more distinguishing features recorded during that time. For example, event component 505 may detect that the majority of the motion events captured by one of more sensors shows the family dog walking past the camera, but that in select clips, the video footage shows the dog running, barking, or playing. Event component 505 may identify these "action" motion events as containing a distinguishing feature. A distinguishing feature may be an action or a descriptor of the video; for example, "video of my dog" or "video of my daughter" or "piano sounds and movement indicative of piano playing." Event component 505 may tag these distinguishing features as specific motion events, such as "dog at play." Event component 505 may then communicate the motion events and tags associated with the motion events to the priority component 510.

In some embodiments, user inputted preferences may be taken into account by event component 305 in identifying one or more distinguishing features. For example, a user may input a preference for clips containing laughter of a baby; event component 305 may then sort the video footage to identify footage containing laughter of the baby, detected by one or more of the sensors. In this way, event component 505 may be operable to tag motion events containing a particular feature according to user preferences even where that feature is not necessarily unique in and of itself.

In some cases, event component 505 may associate the received user preference data and user activity data with the motion event clips and may compile and index the clips in various manners. In one embodiment, event component 505 may group a plurality of motion clips containing the same user, motion clips recorded in the same room, motion clips recorded during the same period of time, motion clips containing the same activity, or a combination thereof. Thus, event component 505 may review video footage from multiple cameras and may determine "dog at play" motion clips. Upon determining or identifying preferred motion clips, event component 505 may group all motion clips containing the "dog at play" distinguishing feature into a single motion clip.

In some embodiments, event component 505 may be configured to determine a pattern in a plurality of motion events. For example, event component 505 may detect that the living room detects motion at 5:30 p.m. when the user returns from work. Event component 505 may tag this pattern as "normal." In some cases, event component 505 may associate detected patterns of motion events with the characteristics identified in the motion events. For example, event component 505 may associate opening of front door at 5:30 pm with the identity of the user returning from work. In some cases, event component 505 may determine a pattern related to occupancy information. Referring back to the previous example, event component 505 may determine that the home is occupied by two individuals after 5:30 p.m. Event component 505 may tag this occupancy information as "regular." In one instance, if event component 505 determines that the home is occupied by 10 individuals, then event component 505 may determine that there is a special event or a party. Event component 505 may then tag the video footage as "interesting."

Priority component 510 may receive clips of motion events in video footage from the event component 505, where the received clips have been identified and categorized by the event component 505, as containing one or more distinguishing features. In addition, the motion events may be tagged by event component 505 prior to sending the motion events to priority component 510. Priority component 510 may further receive data associated with the motion events, such as user identity and activity data collected at receiver component 410-a from one or more sensor units. Priority component 510 may accordingly determine a level of priority associated with the motion events based on the accompanying activity data, user data, and/or inputted user preferences from the receiver component 410-a. In some cases, priority component 510 may automatically receive at least one distinguishing feature in the video footage recorded over a pre-determined period of time from event component 505. Priority component 510 may be configured to assign a level of priority for each motion event detected in a plurality of video footage. In some cases, priority component 510 may receive a group of motion clips with a common distinguishing feature and may assign the same level of priority for each motion event in the group of motion events. Priority component 510 may communicate the determine priorities to frame rate component 515.

In some embodiments, frame rate component 515 may receive from event component 505 a plurality of video footage recorded over the course of a pre-determined period of time. Additionally, frame rate component 515 may receive from priority component 510 a priority associated with each motion event detected in the plurality of video footage. In some cases, the priority may be based on a distinguishing feature present in the motion event. In some examples, frame rate component 515 may a frame rate for a motion event. In some embodiments, the frame rate may be based at least in part on the priority assigned to the motion events. In some examples, the frame rate may be based on the distinguishing feature of the motion event. In some other cases, the frame rate may be based on a user preference. For example, the user preference may comprise an object identified in the video, an audio feature, a visual feature, a time, the location, a threshold occupancy, a detected motion, or a combination thereof.

For example, frame rate component 515 may detect that the user inputted preferences indicate that the user prefers to view video clips of the user's child doing homework and the user's dog playing in the yard. However, priority component 510 may determine that video clips of the user's child doing homework is of a higher priority than the video clips of the user's dog playing in the yard. Accordingly, frame rate component 515 may identify a faster frame rate for video clips of the user's dog playing in the yard and a slower frame rate for video clips of the user's child doing homework. For example, the user may be able to view clips of the user's child doing homework, at a slower speed than clips of the user's dog. In some embodiments, user inputted preferences may be taken into account by event component 305 in identifying one or more distinguishing features in the motion events recorded in the video footage. In some examples, frame rate component 515 may receive a pattern in motion events, as detected by event component 505.

Frame rate component 515 may identify a frame rate for the motion events based at least in part on the received pattern. The motion clips and associated frame rates may then be communicated to time-lapse generating component 520, where a time-lapse representation of the video footage may be generated and packaged for presentation to the user. Time-lapse generating component 520 may receive the plurality of video footage from event component 505, a priority associated with motion events from priority component 510, and a frame rate for motion events from frame rate component 515.

Time-lapse generating component 520 may generate a time-lapse representation of the video having a first frame rate for a first part of the time-lapse representation of the video and a second frame rate different from the first frame rate for a second part of the time-lapse representation of the video. For example, time-lapse generating component 520 may generate a time-lapse representation of plurality of video footage, where a higher priority motion event has a slower speed than a lower priority motion event. In some examples, time-lapse generating component 520 may review the generated time-lapse representation of the video footage to analyze a plurality of motion events. In some cases, time-lapse generating component 520 may identify an emergency event in the time-lapse representation of the video footage, and may communicate an emergency alert to a third party based at least in part on the emergency event.

In some examples, the time-lapse representation of the video footage may be packaged in one or more formats for communication and presentation to the user, such as into any of thumbnails, clips, single-cut videos, or still photographs, or a combination thereof. For example, the time-lapse representation of the video footage containing clips of the day may be packaged into thumbnails showing the "most exciting" portion of each clip on the thumbnail. In one embodiment, the thumbnails may be shown as a slideshow, where the user may be able to select a thumbnail in order to view a video clip relating to the thumbnail in its entirety. The "most exciting" portion of the clip may be determined by priority component 510.

In other embodiments, time-lapse generating component 520 may compile a plurality of video footage into a single-cut video, where the motion events may be played at a slower speed than the rest of the video. In some cases, the user may view the time-lapse representation of video footages including plurality of "interesting" clips from a particular time period in one continuous video; for example, the user may view "interesting" clips from the past week in one continuous video.

In still other embodiments, the plurality of video footage may be compiled at time-lapse generating component 520 into a "storyboard," showing a compilation of thumbnails or still photographs of the "most exciting" portions of each clip to tell a "story;" for example, the story may be a video of the family dog's activities over the course of the week or other pre-determined period of time. Such "storyboards" may be generated based on a characteristic identified by event component 505. In some embodiments, time-lapse generating component 520 may compile a plurality of video footage into a slideshow, where the motion events may be played as a video clip and the rest of the video footage may be displayed as still images.

Time-lapse representation of video footage may then be communicated by time-lapse generating component 520 as a packaged video to transmitter component 420-a for communication to the user. In embodiments where apparatus 405-a is a control panel, local computing device, or remote computing device, the packaged video may be transmitted locally by transmitter component 420-a for display or projection at the apparatus 405-a. In other embodiments, where apparatus 405-a is one or more sensor unit, transmitter component 420-a may communicate the packaged video to any one or more of a control panel, local computing device, or remote computing device for viewing by the user. In still other embodiments, transmitter component 420-a may communicate the packaged video to a server for storage until such time as the user inputs a viewing instruction at, for example, his smartphone or the control panel. Where the packaged video is communicated by transmitter component 420-a to a local or remote computing device, the local or remote computing device may receive the packaged video as any of an email or SMS, or in other embodiments may receive the packaged video at a dedicated application on a smartphone or personal computer for selective display based on user input at the device.

Figure 6:
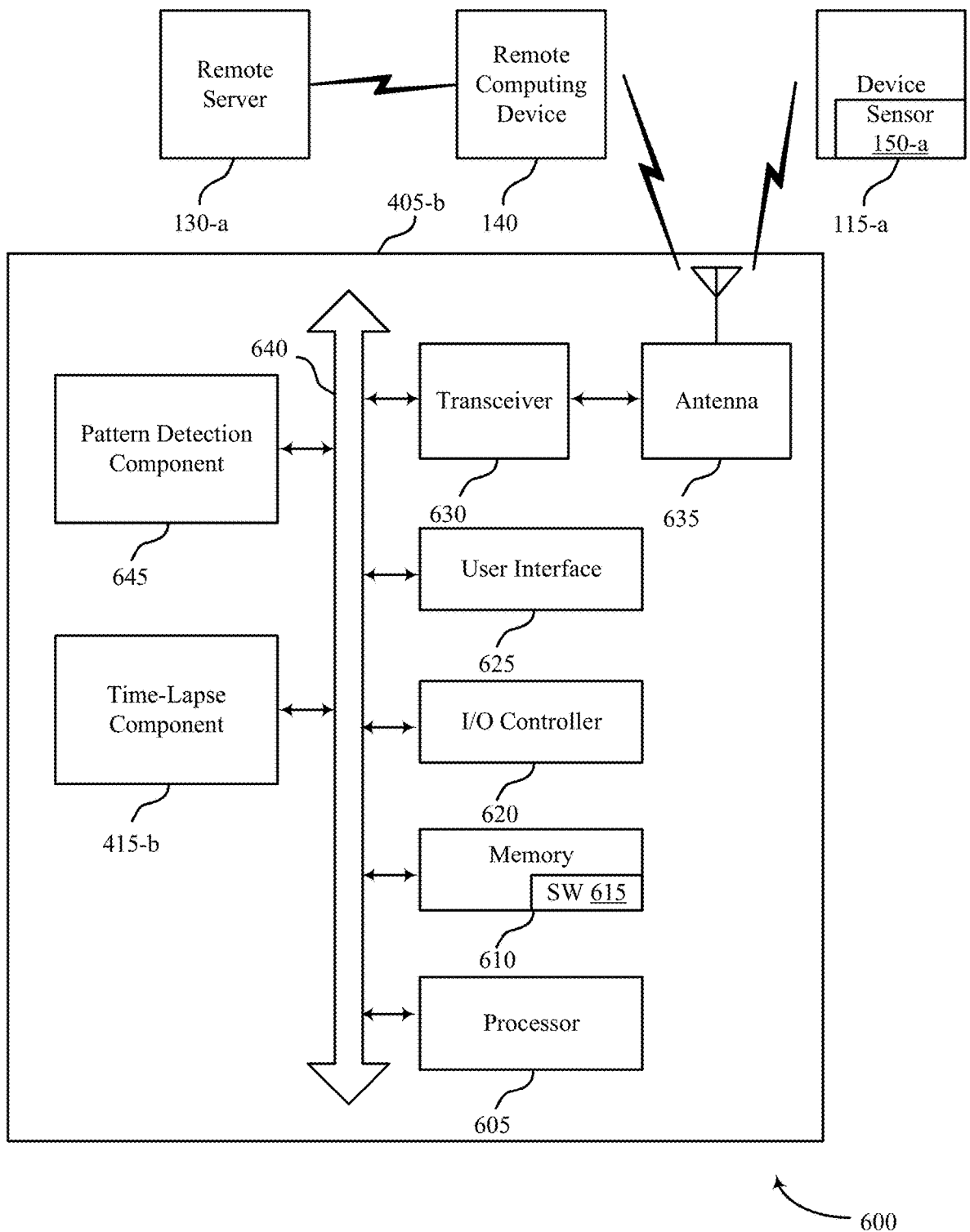
FIG. 6 shows a block diagram of an apparatus relating to a security and/or an automation system, in accordance with various aspects of this disclosure.

FIG. 6 shows a system 600 for use in receiving a plurality of video footage and generating a time-lapse representation of the video footage in accordance with various examples. System 600 may include an apparatus 405-b which may be an example of the control panel 135 of FIG. 1. Apparatus 405-b may also be an example of one or more aspects of apparatus 405 and/or 405-a of FIGS. 4 and 5.

Apparatus 405-b may include a time-lapse component 415-b, which may be an example of the time-lapse component 415 and time-lapse component 415-a described with reference to FIGS. 2 and 3. Apparatus 405-b may also include components for detecting a pattern among received user preferences, and components for receiving user commands. For example, pattern detection component 645 may be operable to detect, based on user inputted preferences, that the user wants to see video footage containing clips of his daughter practicing piano.

The pattern detection component 645 may accordingly detect all clips from the received plurality of video footage containing clips of the user's daughter practicing piano and may further assign a higher priority to motion events of video footage containing other users in the household playing piano on the inference that the user would also wish to see such clips. The pattern detection component 645 may identify other motion events containing other users playing piano, for example, by receiving data from one or more sensor units indicating common audio, vibration, motion, location, or the like.

Apparatus 405-b may also include components for bi-directional data communications including components for transmitting communications and components for receiving communications. For example, apparatus 405-b may communicate time-lapse video footage bi-directionally with one or more of a local computing device 115-a, a remote server 130-a, and/or a remote computing device 140-a. This bi-directional communication may be direct (e.g., apparatus 405-b communicating directly with local computing device 115-a) or indirect (e.g., apparatus 405-b communicating with remote computing device 140-a via remote server 130-a). Remote server 130-a, remote computing device 140-a, and local computing device 115-a may be examples of remote server 130, remote computing device 140, and local computing device 115, 120 as shown with respect to FIG. 1.

As previously discussed, the time-lapse component 415-b be operable to review the plurality of received video footage, along with any accompanying activity data, user data, and/or inputted user preferences, determine a priority for each motion event detected in the recorded video footage, and generate a time-lapse representation of the recorded video footage. For example, time-lapse component 415-*b* may collect video footage recorded over one day, one week, one month, or the like. Using, for example, motion detection data received via one or more sensor units at a receiver component, time-lapse component 415-*b* may sort "high priority" motion events from "low priority" motion events.

Apparatus 405-*b* may also include a processor component 605, a memory 610 (including software (SW) 615), an input/output controller component 620, a user interface component 625, a transceiver component 630, and one or more antennas 635, each of which may communicate—directly or indirectly—with one another (e.g., via one or more buses 640). The transceiver component 630 may communicate bi-directionally—via the one or more antennas 635, wired links, and/or wireless links—with one or more networks or remote devices as described above.

For example, the transceiver component 630 may communicate bi-directionally with one or more of remote server 130-*a* or local computing device 115-*a*. The transceiver component 630 may include a modem to modulate the packets and provide the modulated packets to the one or more antennas 635 for transmission, and to demodulate packets received from the one or more antennas 635. While an apparatus comprising a control panel (e.g., 205-*b*) may include a single antenna 635, the apparatus may also have multiple antennas 635 capable of concurrently transmitting or receiving multiple wired and/or wireless transmissions. In some embodiments, one element of apparatus 405-*b* (e.g., one or more antennas 635, transceiver component 630, etc.) may provide a direct connection to a remote server 130-*a* via a direct network link to the Internet via a POP (point of presence). In some embodiments, one element of apparatus 405-*b* (e.g., one or more antennas 635, transceiver component 630, etc.) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 635 and/or transceiver component 630 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 635 may receive signals or information specific and/or exclusive to itself. In other embodiments each antenna 635 may receive signals or information neither specific nor exclusive to itself.

In some embodiments, the user interface component 625 may include an audio device, such as an external speaker system, an external display device such as a display screen, and/or an input device (e.g., remote control device interfaced with the user interface component 625 directly and/or through I/O controller component 620).

One or more buses 640 may allow data communication between one or more elements of apparatus 405-*b* (e.g., processor component 605, memory 610, I/O controller component 620, user interface component 625, etc.).

The memory 610 may include random access memory (RAM), read only memory (ROM), flash RAM, and/or other types. The memory 610 may store computer-readable, computer-executable software/firmware code 615 including instructions that, when executed, cause the processor component 605 to perform various functions described in this disclosure (e.g., receive a plurality of video footage, detect motion events from the video footage, review the plurality of video footage to identify at least one distinguishing feature, determine a priority of the motion event based on the at least one distinguishing feature, generate time-lapse summary of the video footage according to the priority, etc.). Alternatively, the software/firmware code 615 may not be directly executable by the processor component 605 but may cause a computer (e.g., when compiled and executed) to perform functions described herein.

In some embodiments the processor component 605 may include, among other things, an intelligent hardware device (e.g., a central processing unit (CPU), a microcontroller, and/or an ASIC, etc.). The memory 610 may contain, among other things, the Basic Input-Output system (BIOS) which may control basic hardware and/or software operation such as the interaction with peripheral components or devices. For example, the time-lapse component 415-*b* may be stored within the system memory 610. Applications resident with system 600 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver component 630, one or more antennas 635, etc.).

Many other devices and/or subsystems may be connected to, or may be included as, one or more elements of system 600 (e.g., entertainment system, computing device, remote cameras, wireless key fob, wall mounted user interface device, cell radio component, battery, alarm siren, door lock, lighting system, thermostat, home appliance monitor, utility equipment monitor, and so on). In some embodiments, all of the elements shown in FIG. 6 need not be present to practice the present systems and methods. The devices and subsystems can be interconnected in different ways from that shown in FIG. 6. In some embodiments, an aspect of some operation of a system, such as that shown in FIG. 6, may be readily known in the art and is not discussed in detail in this disclosure. Code to implement the present disclosure may be stored in a non-transitory computer-readable medium such as one or more of system memory 610 or other memory. The operating system provided on I/O controller component 620 may be iOS®, ANDROID®, MS-DOS®, MS-WINDOWS®, OS/2®, UNIX®, LINUX®, or another known operating system.

The components of the apparatus 405-*b* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented—in whole or in part—with instructions embodied in memory formatted to be executed by one or more general and/or application-specific processors.

Figure 7:
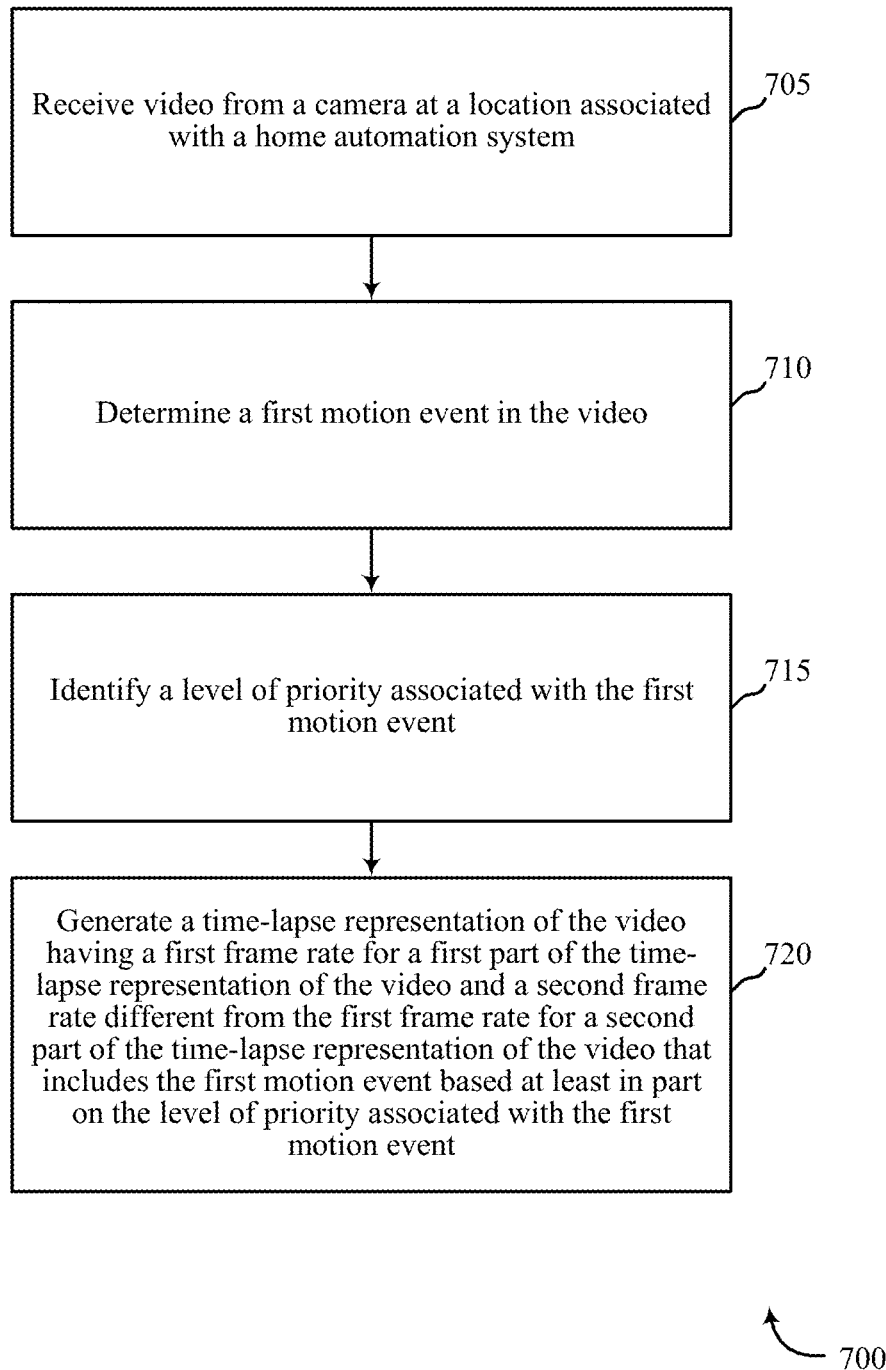
FIG. 7 is a flow chart illustrating an example of a method relating to a security and/or an automation system, in accordance with various aspects of this disclosure.

FIG. 7 is a flow chart illustrating an example of a method 700 for a security and/or automation system, in accordance with various embodiments. For clarity, the method 700 is described below with reference to aspects of one or more of the sensor units 110, local computing device 115, 120, control panel 135, and/or remote computing device 140 described with reference to FIGS. 1-6, and/or aspects of one or more of the apparatus 405, 405-*a*, or 405-*b* described with reference to FIGS. 4-6. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 705, the method 700 may include receive video from a camera at a location associated with a home automation system. For example, video footage may be received from multiple video cameras positioned throughout the interior of the home, as well as one or more video cameras mounted outside the home. The video cameras may be continuously operated in some embodiments, while in other embodiments, the video cameras may record at pre-determined intervals or in response to a trigger, such as detected light, motion, or audio, or a combination thereof. In some embodiments, video footage received from a plurality of video monitors may include visual footage from one or more monitors, and audio footage from the same or separate one or more monitors. The operations of block 705 may be performed according to the methods described with reference to FIGS. 1 through 6. In certain examples, aspects of the operations of block 705 may be performed by a time-lapse component as described with reference to FIGS. 4 through 6.

At block 710, the method 700 may include determining a first motion event in the video. For example, the home automation system may review video footage recorded over the period of a day, a week, a month, or any other period of time. In some embodiments, the period of time reviewed may vary based on the activity detected over that period of time. For example, where the home automation system reviews video footage over the previous day only to find that the home was unoccupied during the entirety of that day, the home automation system may then review video footage recorded over the previous two days, or so on, until activity is detected. Thus, where a family goes out of town, for example, and the home is unoccupied, the system may pass over or discard empty, "non-action" footage. The period of review may be selected based on pre-determined parameters, or may be selected automatically by the system based on monitored activity. The operations of block 710 may be performed according to the methods described with reference to FIGS. 1 through 6. In certain examples, aspects of the operations of block 710 may be performed by an event component as described with reference to FIG. 5.

At block 715, the method 700 may include identifying a level of priority associated with the first motion event. In some cases, the home automation system may identify at least one distinguishing feature in the motion event over a pre-determined period of time. As previously discussed, by reviewing the plurality of video footage over the pre-determined period of time, the system may identify clips of video footage containing motion. These motion clips may contain unusual or distinguishing features, such as unique audio, visual, location, occupancy, heart rate, vibration, motion, user identity, or other data. This data may be received as activity data and/or user data gathered from one or more sensor units.

For example, the system may identify that, over the previous week, several instances of increased vibration were detected by one or more sensor units. The accompanying video footage from these periods of increased vibration may therefore be automatically flagged by the system as containing distinguishing features, where the distinguishing feature may perhaps be the result of members of the household dancing or playing in the home. Therefore, the system may determine a higher priority for motion events with higher vibration as compared to other motion events. In other embodiments, the system may identify distinguishing features based on any of user input, accessed user digital calendars, or the like. The operations of block 715 may be performed according to the methods described with reference to FIGS. 1 through 6. In certain examples, aspects of the operations of block 715 may be performed by a priority component as described with reference to FIG. 5.

At block 720, the method 700 may include generating a time-lapse representation of the video having a first frame rate for a first part of the time-lapse representation of the video and a second frame rate different from the first frame rate for a second part of the time-lapse representation of the video that includes the first motion event based at least in part on the level of priority associated with the first motion event. The home automation system may generate the time-lapse representation of the video based, at least in part, on identifying the at least one motion event in the video footage and a priority associated with the motion event.

The system may generate a frame rate associated with each motion event. For example, a motion event which is "high priority," may have a slower frame rate than a "lower priority" motion event. In some cases, the priority may be based on a distinguishing feature of each motion event. This time-lapse representation of the video footage may then be packaged and stored or presented to the user for viewing. For example, as previously discussed, the time-lapse representation of the video footage may be assembled into any of slideshow, continuous videos, a combination of images and video clips, thumbnails, single-cut videos, still photographs, storyboards, or a combination thereof. The time-lapse representation of the video footage may be presented as "summary of the day."

The time-lapse representation of the video footage may be viewable by one or more user at any of a control panel, local computing device, or remote computing device. Where the time-lapse representation of the video footage is viewed at a control panel, the time-lapse may be displayed on or projected from the control panel either in response to user input triggering the display, or in some embodiments, upon detecting user approach at the control panel. Where the time-lapse representation of the video footage is viewed at a local or remote computing device, the time-lapse may be viewed in a dedicated application, for example on a smartphone, personal computer, or tablet. The operations of block 720 may be performed according to the methods described with reference to FIGS. 1 through 6. In certain examples, aspects of the operations of block 720 may be performed by a time-lapse generating component as described with reference to FIG. 5.

Thus, the method 700 may provide for time-lapse video generating methods relating to security and/or automation systems. It should be noted that the method 700 is just one implementation and that the operations of the method 700 may be rearranged or otherwise modified such that other implementations are possible.

Figure 8:
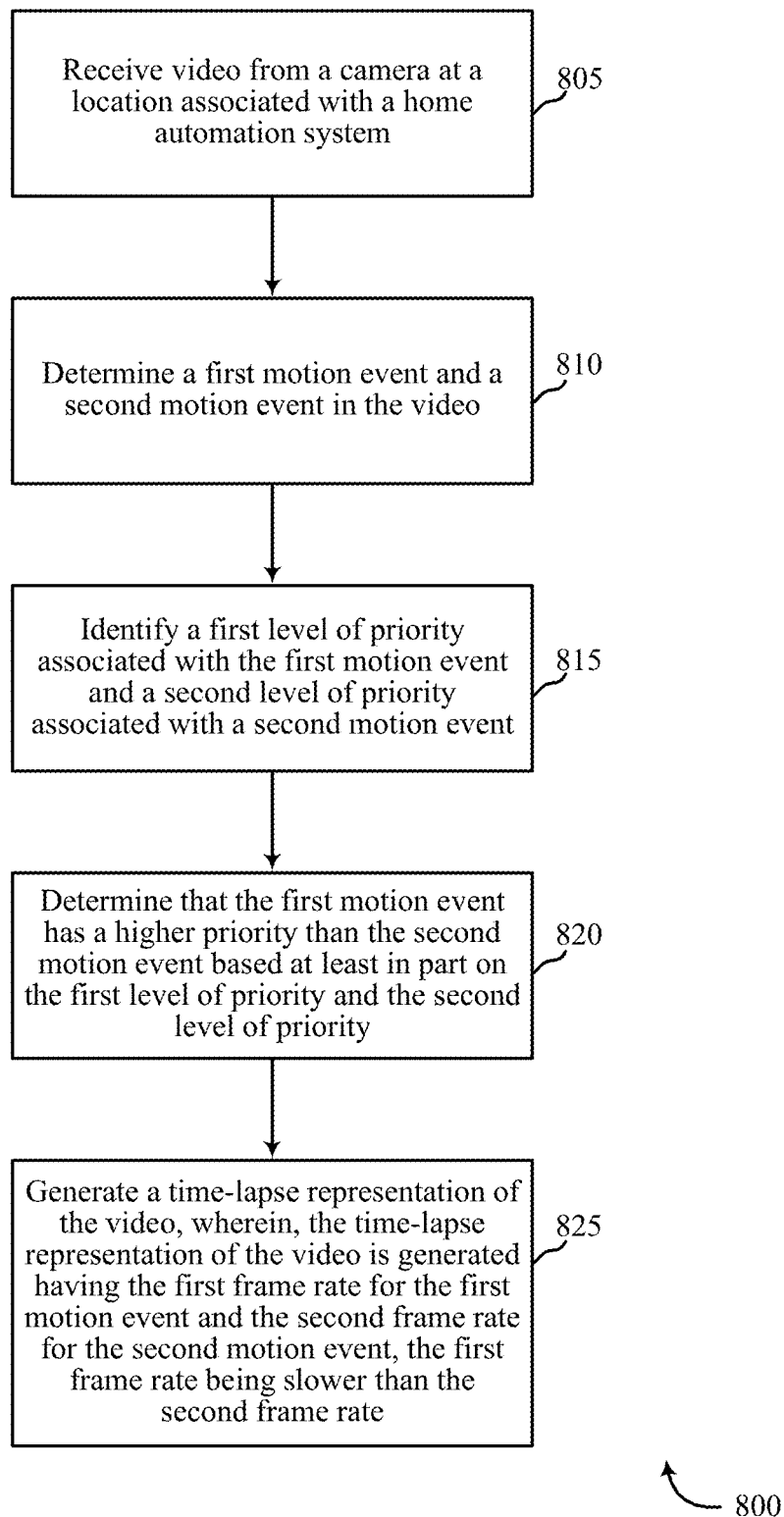
FIG. 8 is a flow chart illustrating an example of a method relating to a security and/or an automation system, in accordance with various aspects of this disclosure.

FIG. 8 is a flow chart illustrating an example of a method 800 for a security and/or automation system, in accordance with various embodiments. For clarity, the method 800 is described below with reference to aspects of one or more of the sensor units 110, local computing device 115, 120, control panel 135, and/or remote computing device 140 described with reference to FIGS. 1-6, and/or aspects of one or more of the apparatus 405, 405-a, or 405-b described with reference to FIGS. 4-6. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 805, the method 800 may include receive video from a camera at a location associated with a home automation system. As discussed above, video footage may be received from multiple video cameras positioned throughout the interior of the home, as well as one or more video cameras mounted outside the home. The operations of block 805 may be performed according to the methods described with reference to FIGS. 1 through 6. In certain examples, aspects of the operations of block 805 may be performed by a time-lapse component as described with reference to FIGS. 4 through 6.

At block 810, the method 800 may include determining a first motion event and a second motion event in the video. For example, the home automation system may review video footage recorded over the pre-determined period of time. In some cases, the pre-determined period of time may be automatically selected by the home automation system. In some cases, the period of time may be inputted by the user. In some embodiments, the period of time reviewed may vary based on the activity detected over that period of time. In some embodiments, the first motion event is different from the second motion event. For example, the first motion event may have different distinguishing features than the second motion event. In some cases, the first motion event may occur at a different location than the second motion event. The home automation system may be configured to consolidate video footage from multiple cameras and detect motion events from the consolidated video footage. The operations of block 810 may be performed according to the methods described with reference to FIGS. 1 through 6. In certain examples, aspects of the operations of block 810 may be performed by an event component as described with reference to FIG. 5.

At block 815, the method 800 may include identifying a first level of priority associated with the first motion event and a second level of priority associated with a second motion event. In some cases, the home automation system may identify a first distinguishing feature in the first motion event and a second distinguishing feature in the second motion event. In some cases, the home automation system may identify the first level of priority and the second level of priority based at least in part on a user preference. For example, the user preference may comprise an object identified in the video, an audio feature, a visual feature, a time, the location, a threshold occupancy, a detected motion, or a combination thereof. The operations of block 815 may be performed according to the methods described with reference to FIGS. 1 through 6. In certain examples, aspects of the operations of block 815 may be performed by a priority component as described with reference to FIG. 5.

At block 820, the method 800 may include determining that the first motion event has a higher priority than the second motion event based at least in part on the first level of priority and the second level of priority. In some cases, the home automation system may determine that the first motion event has a higher priority than the second motion event, based on a distinguishing feature for each motion event. For example, the system may determine that a motion event related to a pet may be less important than a motion event related to a stranger on the porch. The operations of block 820 may be performed according to the methods described with reference to FIGS. 1 through 6. In certain examples, aspects of the operations of block 820 may be performed by a priority component as described with reference to FIG. 5.

At block 825, the method 800 may include generating a time-lapse representation of the video. In some cases, the time-lapse representation of the video is generated having the first frame rate for the first motion event and the second frame rate for the second motion event, the first frame rate being slower than the second frame rate. The home automation system may generate the time-lapse representation of the video based, at least in part, on identifying that the first motion event in the video footage has a higher priority than the second motion event. The system may generate a frame rate associated with the first motion event and the second motion event.

For example, the first motion event may have a slower frame rate than the second motion event. In some cases, the priority may be based on a distinguishing feature of each motion event. This time-lapse representation of the video footage may then be assembled into any of slideshow, continuous videos, a combination of images and video clips, thumbnails, single-cut videos, still photographs, storyboards, or a combination thereof. The time-lapse representation of the video footage may be presented as "summary of the day," and may be transmitted to a device associated with a user of the security and/or automation system via an email, a text message, a notification to an application of the security and/or automation system, or a combination thereof. The operations of block 825 may be performed according to the methods described with reference to FIGS. 1 through 6. In certain examples, aspects of the operations of block 825 may be performed by a time-lapse generating component as described with reference to FIG. 5.

Thus, the method 800 may provide for time-lapse video generating methods relating to security and/or automation systems. It should be noted that the method 800 is just one implementation and that the operations of the method 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques; for example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices; for example, a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims; for example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed; for example, if a composition is described as containing components. A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software components that perform certain tasks. These software components may include script, batch, or other executable files that may be stored on a computer-readable storage medium or in a computing system. In some embodiments, these software components may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and automation systems, comprising:

receiving, using a processor, a plurality of video footage recorded during a predetermined duration;

identifying a plurality of segments of the video footage;

determining one or more user preferences input by a user of the systems, the one or more user preferences associated with the plurality of video footage to identify a first level of priority for a first distinguishing feature selected by the user and a second level of priority for a second distinguishing feature selected by the user;

assigning a frame rate to each of the plurality of segments of the video footage based at least in part on determining the one or more user preferences associated with the plurality of video footage; and generating a time-lapse representation of the video based at least in part on assigning the frame rate to each of the plurality of segments of the video footage;

displaying, using a display screen of a user interface of the systems, the time-lapse representation of the video.

2. The method of claim 1, further comprising:
assigning a level of priority to each of the plurality of segments of the video footage, wherein assigning the frame rate to each of the plurality of segments is based at least in part on assigning the level of priority to each of the plurality of segments of the video footage.

3. The method of claim 2, wherein each level of priority is based at least in part on a distinguishing feature present in a respective segment of the plurality of segments of the video footage.

4. The method of claim 1, further comprising:
receiving one or more user preferences associated with the plurality of video footage, wherein assigning the frame rate to each of the plurality of segments is based at least in part on receiving one or more user preferences associated with the plurality of video footage.

5. The method of claim 4, wherein each of the first distinguishing feature and the second distinguishing feature comprises an object identified in the plurality of video footage, an audio feature, a visual feature, a time, a location of the user, a threshold occupancy, a detected motion, or a combination thereof.

6. The method of claim 1, further comprising:
packaging the time-lapse representation of the video into a thumbnail, a clip, a single-cut video, a series of still photographs, or a combination thereof; and
transmitting the packaged time-lapse representation of the video to a control panel of a home automation security system.

7. The method of claim 1, further comprising:
analyzing the time-lapse representation of the video;
identifying an emergency event in the time-lapse representation of the video; and
transmitting a notification to the user based at least in part on identifying the emergency event.

8. An apparatus for security and automation systems, comprising:
a processor;
memory in electronic communication with the processor; and
instructions stored in the memory, the instructions being executable by the processor to:
receive, using the processor, a plurality of video footage recorded during a predetermined duration;
identify a plurality of segments of the video footage;
determine one or more user preferences input by a user of the systems, the one or more user preferences associated with the plurality of segments of the video footage to identify a first level of priority for a first distinguishing feature selected by the user and a second level of priority for a second a distinguishing feature selected by the user;

assign a frame rate to each of the plurality of segments of the video footage based at least in part on determining the one or more user preferences associated with the plurality of video footage; and generate a time-lapse representation of the video based at least in part on assigning the frame rate to each of the plurality of segments of the video footage;

display, using a display screen of a user interface of the systems, the time-lapse representation of the video.

9. The apparatus of claim 8, wherein the instructions further being executable by the processor to:
assign a level of priority to each of the plurality of segments of the video footage, wherein assigning the frame rate to each of the plurality of segments is based at least in part on assigning the level of priority to each of the plurality of segments of the video footage.

10. The apparatus of claim 9, wherein each level of priority is based at least in part on a distinguishing feature present in a respective segment of the plurality of segments of the video footage.

11. The apparatus of claim 8, wherein the instructions further being executable by the processor to:
receive one or more user preferences associated with the plurality of video footage, wherein assigning the frame rate to each of the plurality of segments is based at least in part on receiving one or more user preferences associated with the plurality of video footage.

12. The apparatus of claim 11, wherein each of the first distinguishing feature and the second distinguishing feature comprises an object identified in the video footage, an audio feature, a visual feature, a time, a location of the user, a threshold occupancy, a detected motion, or a combination thereof.

13. The apparatus of claim 8, wherein the instructions further being executable by the processor to:
package the time-lapse representation of the video into a thumbnail, a clip, a single-cut video, a series of still photographs, or a combination thereof; and
transmit the packaged time-lapse representation of the video to a control panel of a home automation security system.

14. The apparatus of claim 8, wherein the instructions further being executable by the processor to:
analyze the time-lapse representation of the video;
identify an emergency event in the time-lapse representation of the video; and
transmit a notification to the user based at least in part on identifying the emergency event.

15. A non-transitory computer-readable medium storing computer-executable code, the code executable by a processor to:
receive, using the processor, a plurality of video footage recorded during a predetermined duration;
identify a plurality of segments of the video footage;
determine one or more user preferences input by a user of a security system, the one or more user preferences associated with the plurality of segments of the video footage to identify a first level of priority for a first distinguishing feature selected by the user and a second level of priority for a second distinguishing feature selected by the user;
assign a frame rate to each of the plurality of segments of the video footage based at least in part on determining the one or more user preferences associated with the plurality of video footage; and generate a time-lapse representation of the video based at least in part on assigning the frame rate to each of the plurality of segments of the video footage;

display, using a display screen of a user interface of the security system, the time-lapse representation of the video.

16. The non-transitory computer-readable medium of claim 15, wherein the code further executable by the processor to:

assign a level of priority to each of the plurality of segments of the video footage, wherein assigning the frame rate to each of the plurality of segments is based at least in part on assigning the level of priority to each of the plurality of segments of the video footage.

17. The non-transitory computer-readable medium of claim 16, wherein each level of priority is based at least in part on a distinguishing feature present in a respective segment of the plurality of segments of the video footage.

18. The non-transitory computer-readable medium of claim 15, wherein the code further executable by the processor to:

receive one or more user preferences associated with the plurality of video footage, wherein assigning the frame rate to each of the plurality of segments is based at least in part on receiving one or more user preferences associated with the plurality of video footage.

19. The non-transitory computer-readable medium of claim 18, wherein each of the first distinguishing feature and the second distinguishing feature comprises an object identified in the video footage, an audio feature, a visual feature, a time, a location of the user, a threshold occupancy, a detected motion, or a combination thereof.

20. The non-transitory computer-readable medium of claim 15, wherein the code further executable by the processor to:

package the time-lapse representation of the video into a thumbnail, a clip, a single-cut video, a series of still photographs, or a combination thereof; and transmit the packaged time-lapse representation of the video to a control panel of a home automation security system.

* * * * *